(12) United States Patent
Terayama et al.

(10) Patent No.: US 12,009,556 B2
(45) Date of Patent: Jun. 11, 2024

(54) FUEL CELL SYSTEM AND CONTROL METHOD FOR FUEL CELL SYSTEM

(71) Applicant: Panasonic Intellectual Property Management Co., Ltd., Osaka (JP)

(72) Inventors: Takeshi Terayama, Osaka (JP); Tomohiro Kuroha, Osaka (JP); Kyohei Kawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/807,107

(22) Filed: Jun. 15, 2022

(65) Prior Publication Data

US 2022/0311030 A1 Sep. 29, 2022

Related U.S. Application Data

(63) Continuation of application No. PCT/JP2020/049222, filed on Dec. 28, 2020.

(30) Foreign Application Priority Data

Jan. 17, 2020 (JP) ................................. 2020-006261

(51) Int. Cl.
*H01M 8/04* (2016.01)
*H01M 8/04089* (2016.01)
(Continued)

(52) U.S. Cl.
CPC ... *H01M 8/04303* (2016.02); *H01M 8/04089* (2013.01); *H01M 8/04873* (2013.01); *H01M 8/1004* (2013.01); *H01M 8/1016* (2013.01)

(58) Field of Classification Search
CPC ......... H01M 8/04303; H01M 8/04089; H01M 8/04873; H01M 8/1004; H01M 8/1016
See application file for complete search history.

(56) References Cited

U.S. PATENT DOCUMENTS

2012/0028149 A1 2/2012 Hatada
2013/0130140 A1* 5/2013 Kato ................... H01M 8/0432
429/432
(Continued)

FOREIGN PATENT DOCUMENTS

JP 2006-164939 6/2006
JP 2011-003305 1/2011
(Continued)

OTHER PUBLICATIONS

Han et al. (J. Mater. Chem. A, 2015, 3, 1243-1250).*
International Search Report of PCT application No. PCT/JP2020/049222 dated Mar. 30, 2021.

*Primary Examiner* — Olatunji A Godo
(74) *Attorney, Agent, or Firm* — Rimon P.C.

(57) ABSTRACT

The fuel cell system of the present disclosure includes: a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas; a power source that applies a voltage to the fuel cell; and a controller. In a shutdown process, the controller controls the power source to apply the voltage to the fuel cell such that a terminal voltage of the fuel cell is equal to or higher than an open circuit voltage of the fuel cell.

19 Claims, 5 Drawing Sheets

(51) Int. Cl.
    *H01M 8/04303*      (2016.01)
    *H01M 8/04858*      (2016.01)
    *H01M 8/1004*      (2016.01)
    *H01M 8/1016*      (2016.01)

(56) References Cited

U.S. PATENT DOCUMENTS

| | | | |
|---|---|---|---|
| 2015/0288041 A1* | 10/2015 | Forte | H01M 8/04302 |
| | | | 429/429 |
| 2018/0375129 A1 | 12/2018 | Yaguchi | |
| 2022/0285713 A1* | 9/2022 | Kawagoe | H01M 8/1213 |

FOREIGN PATENT DOCUMENTS

| | | |
|---|---|---|
| JP | 2017-111922 | 6/2017 |
| JP | 2018-186075 | 11/2018 |
| WO | 2017/110303 | 6/2017 |
| WO | 2018/230248 | 12/2018 |

\* cited by examiner

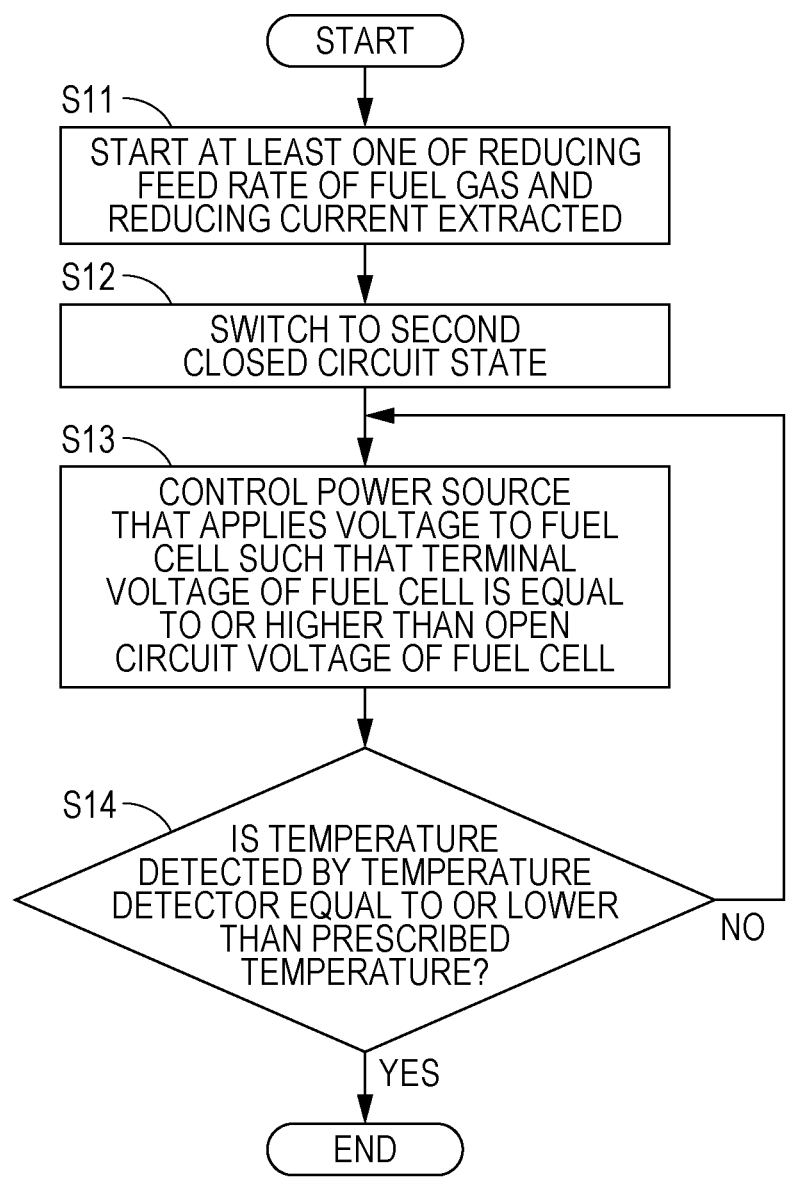

FUEL CELL SYSTEM AND CONTROL METHOD FOR FUEL CELL SYSTEM

BACKGROUND

1. Technical Field

The present disclosure relates to a fuel cell system and a method for controlling the fuel cell system.

2. Description of the Related Art

One known example of a fuel cell system using a solid oxide fuel cell is a fuel cell in Japanese Unexamined Patent Application Publication No. 2017-111922. In this fuel cell system, the fuel cell is supplied with an anode gas and a cathode gas to generate electric power. When a request to stop the power generation is received, the controller continues extracting current from the fuel cell while the amount of the anode gas fed to the fuel cell is controlled based on the extracted current.

SUMMARY

However, when the shutdown control of the fuel cell system in Japanese Unexamined Patent Application Publication No. 2017-111922 is applied to a fuel cell that uses a proton conducting electrolyte membrane, deterioration of the anode due to a shortage of the fuel gas may still occur.

One non-limiting and exemplary embodiment provides a fuel cell system that can be shut down while deterioration of the fuel cell is prevented and a method for controlling the fuel cell system.

In one general aspect, the techniques disclosed here feature a fuel cell system including: a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas; a power source that applies a voltage to the fuel cell; and a controller, wherein, in a shutdown process, the controller controls the power source to apply the voltage to the fuel cell such that a terminal voltage of the fuel cell is equal to or higher than an open circuit voltage of the fuel cell.

The fuel cell system of the present disclosure and the fuel cell system control method of the present disclosure have the effect that the fuel cell system can be shut down while deterioration of the fuel cell is prevented.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flowchart showing an example of the control method performed in the shutdown process of a fuel cell system in a modification of the second embodiment of the present disclosure.

Figure 1:
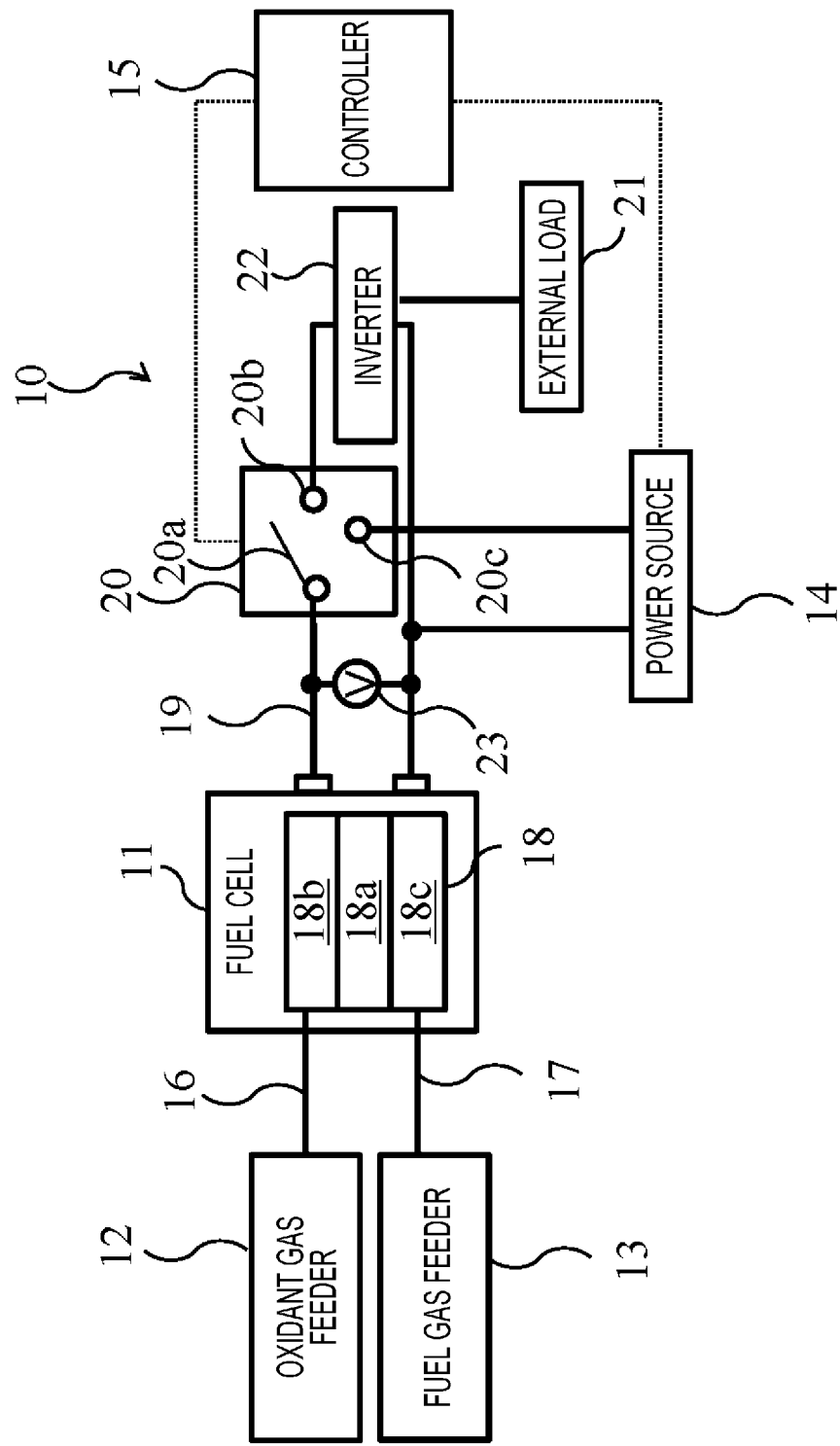
FIG. 1 is a block diagram schematically showing an example of the structure of a fuel cell system according to a first embodiment of the present disclosure.

DETAILED DESCRIPTIONS (Findings Underlying the Present Disclosure)

The present inventors have conducted extensive studies in order to shut down a fuel cell system while deterioration of the fuel cell is prevented. As a result, the inventors have found that the conventional technique has the following problem.

Specifically, the fuel cell includes an anode, a cathode, and an electrolyte membrane sandwiched therebetween. Solid oxide fuel cells are broadly classified into oxide ion conducting fuel cells and proton conducting fuel cells according to the type of electrolyte membrane.

For example, in an oxide ion conducting fuel cell, an oxide ion conducting material such as stabilized zirconia is used for the electrolyte membrane. In such an electrolyte membrane, oxide ions migrate during power generation, but its hole conductivity is extremely small. Therefore, when electrons are generated in the fuel cell by an electrochemical reaction using a fuel gas and an oxidant gas, the electrons do not pass through the electrolyte membrane, and all the electrons flow to an external load through an external circuit.

Therefore, all the current generated by the power generation is extracted to the outside. The consumption of the fuel gas (hereinafter may be referred to as "fuel consumption") computed from the extracted current coincides with the actual fuel consumption. Therefore, the relation between the extracted current and the fuel consumption is represented by formula (1) below. Here, the fuel gas used is hydrogen, and F is the Faraday constant.

$$\text{Fuel consumption [mol/s]} = \text{extracted current } [A]/2F \text{ [C/mol]} \quad (1)$$

Therefore, when the oxide ion conducting fuel cell is in an open circuit state, no electric current path is present between the anode and the cathode. In this case, the extracted current flowing through the external circuit is 0. Therefore, the fuel consumption of the fuel cell is 0, and no shortage of the fuel gas occurs even when the feed of the fuel gas is stopped, so long as no other cause other than the electrochemical reaction is present.

In a proton conducting fuel cell, a proton conducting electrolyte material is used. Examples of the proton conducting electrolyte material include perovskite complex oxides having compositions represented by $BaCe_{1-x}M_xP_{3-\alpha}$, $BaZr_{1-x-y}Ce_xM_yO_{3-\alpha}$, and $BaZr_{1-x}M_xO_{3-\alpha}$ (where M is a trivalent substituent element, x is $0<x<1$, y is $0<y<1$, $x+y=1$, and $\alpha$ is an oxygen deficiency and is $0<\alpha<0.5$). Such an electrolyte membrane has proton conductivity and also has hole conductivity.

Therefore, the electrons generated by the electrochemical reaction flow not only through the external circuit but also through the electrolyte membrane. In this case, the electric current generated by the electrochemical reaction, the extracted current flowing through the external circuit, and the current flowing through the electrolyte membrane (the electron-hole current) satisfy the relation represented by the following formula (2).

Current generated by electrochemical reaction [$A$]=extracted current flowing through external circuit [$A$]+current flowing through electrolyte membrane [$A$] (2)

When the fuel gas is hydrogen and the Faraday constant is denoted by F, the fuel consumption can be derived as formula (3) below using formula (2). As shown by formula (3), even when the proton conducting fuel cell is in an open circuit state and the extracted current is 0, the fuel consumption is not 0 because of the current flowing through the electrolyte membrane. Therefore, in the proton conducting fuel cell, the consumption of the fuel gas is larger than a fuel consumption estimated from the current extracted to the outside. Even when the extracted current is reduced to 0, it is difficult to reduce the fuel consumption to 0.

Fuel consumption [mol/s]=(extracted current flowing through external circuit [$A$]+current flowing through electrolyte membrane [$A$])/2$F$ [C/mol] (3)

Suppose, for example, that the operating temperature of the proton conducting fuel cell is 600° C., that the density of the current extracted from the fuel cell stack is 0.22 A/cm$^2$, and the ratio of the fuel gas consumed during power generation (the fuel consumption) to the feed rate of the fuel is set to 85%. Under these conditions, even when the fuel cell is in an open circuit state and the extracted current is 0, the ratio of the fuel consumption to the feed rate of the fuel is equal to or more than 25%.

As described above, the ratio of the extracted current flowing through the external circuit to the current generated by the electrochemical reaction that consumes the fuel differs between the proton conducting fuel cell and the oxide ion conducting fuel cell. Therefore, in the proton conducting fuel cell, it is difficult to control the feed rate of the fuel gas according to the extracted current in the same manner as in the fuel cell system in Japanese Unexamined Patent Application Publication No. 2017-111922. Thus, a shortage of the fuel gas may cause deterioration of the fuel cell.

Accordingly, the present inventors have found that, by controlling a power source to apply a voltage to the fuel cell in a shutdown process such that the terminal voltage of the fuel cell is equal to or higher than the open circuit voltage of the fuel cell, the fuel cell system can be shut down while deterioration of the fuel cell is prevented.

A fuel cell system according to a first aspect of the present disclosure includes: a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas; a power source that applies a voltage to the fuel cell; and a controller, wherein, in a shutdown process, the controller controls the power source to apply the voltage to the fuel cell such that a terminal voltage of the fuel cell is equal to or higher than an open circuit voltage of the fuel cell.

In the above structure, since the consumption of the fuel gas caused by hole conduction in the fuel cell is reduced, the fuel cell can be shut down while deterioration of the fuel cell due to a shortage of the fuel gas can be prevented.

According to a second aspect of the present disclosure, in the fuel cell system in the first aspect, the controller controls the power source in the shutdown process such that the terminal voltage is equal to or higher than the open circuit voltage and lower than a voltage at which electrolysis of water starts at the cathode.

The voltage at which the electrolysis of water starts is the voltage at which the generation of hydrogen starts at the anode of the fuel cell and the decomposition of water starts at the cathode.

In the above structure, since the occurrence of water electrolysis at the cathode is reduced, the shutdown process of the fuel cell system can be performed while a shortage of water due to the electrolysis and oxidation-reduction reactions at the electrodes due to the water shortage are prevented.

According to a third aspect, the fuel cell system in the first or second aspect further includes a temperature detector that detects a temperature of the fuel cell, wherein the electrolyte membrane has hole conductivity, and wherein the controller controls the power source in the shutdown process such that the terminal voltage is equal to or higher than the open circuit voltage until the temperature detected by the temperature detector is determined to be equal to or lower than a temperature at which hole conduction in the electrolyte membrane decreases.

In the above structure, the voltage is applied to the fuel cell such that the terminal voltage is equal to or higher than the open circuit voltage at a temperature higher than the temperature at which the hole conduction decreases. Therefore, the fuel cell can be shut down while the shortage of the fuel gas caused by the hole conduction is reduced more reliably.

According to a fourth aspect of the present disclosure, the fuel cell system in any one of the first to third aspects further includes a temperature detector that detects a temperature of the fuel cell, wherein the controller controls the power source in the shutdown process such that the terminal voltage is equal to or higher than the open circuit voltage until the temperature detected by the temperature detector is determined to be equal to or lower than a temperature at which an oxidation-reduction reaction at the anode slows down.

In the above structure, the voltage is applied to the fuel cell such that the terminal voltage is equal to or higher than the open circuit voltage when the temperature of the fuel cell is higher than the temperature at which the oxidation-reduction reaction at the anode slows down. This allows the shutdown process of the fuel cell system to be performed while a shortage of the fuel gas and the oxidation-reduction reaction at the anode caused by the shortage of the fuel gas are prevented.

According to a fifth aspect of the present disclosure, in the fuel cell system in the third or fourth aspect, the controller controls the power source in the shutdown process such that the terminal voltage is equal to or higher than the open circuit voltage until the temperature detected by the temperature detector is determined to be equal to or lower than 500° C.

In the above structure, the voltage is applied to the fuel cell such that the terminal voltage is equal to or higher than the open circuit voltage when the temperature of the fuel cell is higher than 500° C. This allows the shutdown process of the fuel cell system to be performed while a shortage of the fuel gas and the oxidation-reduction reaction at the anode caused by the shortage of the fuel gas are prevented.

According to a sixth aspect of the present disclosure, in the fuel cell system in the third or fourth aspect, the controller controls the power source in the shutdown process such that the terminal voltage is equal to or higher than the open circuit voltage until the temperature detected by the temperature detector is determined to be equal to or lower than 400° C.

In the above structure, the voltage is applied to the fuel cell such that the terminal voltage is equal to or higher than the open circuit voltage when the temperature of the fuel cell is higher than 400° C. This allows the shutdown process of the fuel cell system to be performed while a shortage of the fuel gas and the oxidation-reduction reaction at the anode caused by the shortage of the fuel gas are prevented.

According to a seventh aspect of the present disclosure, the fuel cell system in any one of the first to sixth aspects further includes a voltage detector that detects a voltage of the fuel cell, wherein the open circuit voltage is the voltage of the fuel cell that is detected by the voltage detector when no electric current is inputted/outputted to/from the fuel cell.

In the above structure, the voltage at which the electrolysis of water starts is not lower than the open circuit voltage. When the temperature of the fuel cell decreases to the temperature at which hole conduction in the electrolyte membrane decreases, the temperature at which the oxidation-reduction reaction at the anode slows down, a temperature equal to or lower than 500° C., or a temperature equal to or lower than 400° C., the consumption of the fuel gas is stopped at the open circuit voltage. Therefore, by setting the threshold value of the voltage applied to the fuel cell to the open circuit voltage, the shutdown process of the fuel cell system can be performed while the deterioration of the fuel cell is prevented more reliably.

According to an eighth aspect of the present disclosure, in the fuel cell system in any one of the first to seventh aspects, the shutdown process is performed in a period from when the temperature of the fuel cell starts decreasing until the temperature of the fuel cell becomes lower than 200° C. In the above structure, the fuel cell system can be shut down while the deterioration of the fuel cell is prevented more reliably.

According to a ninth aspect of the present disclosure, the fuel cell system in any one of the first to eight aspects further includes: a fuel gas feeder that feeds the fuel gas to the anode; and an oxidant gas feeder that feeds the oxidant gas to the cathode. In the above structure, the fuel cell system can be shut down while the deterioration of the fuel cell is prevented more reliably.

According to a tenth aspect of the present disclosure, in the fuel cell system in the ninth aspect, the controller controls the fuel gas feeder in the shutdown process such that the amount of the fuel gas fed to the anode is larger than a fuel consumption of the fuel cell. In the above structure, since the shortage of the fuel gas at the anode is reduced, the fuel cell system can be shut down while the deterioration of the fuel cell is prevented more reliably.

According to an eleventh aspect of the present disclosure, in the fuel cell system in any one of the first to tenth aspects, the power source is an electrical power system, a power generator, or a battery. In the above structure, by extracting electric power from the electrical power system, the power generator, or the battery, the voltage can be applied to the fuel cell stably.

According to a twelfth aspect of the present disclosure, in the fuel cell system in any one of the first to eleventh aspects, the fuel cell is a solid oxide fuel cell. With the above structure, the fuel cell system can operate more stably and more efficiently even under high-temperature operating conditions.

According to a thirteenth aspect of the present disclosure, in the fuel cell system in any one of the first to twelfth aspects, the electrolyte membrane contains an oxide. With the above structure, the fuel cell system can operate more stably and more efficiently even under high-temperature operating conditions.

According to a fourteenth aspect of the present disclosure, in the fuel cell system in any one of the first to twelfth aspects, the electrolyte membrane contains a compound represented by $BaCe_{1-x}M_xO_{3-\alpha}$, $BaZr_{1-x-y}Ce_xM_yO_{3-\alpha}$, or $BaZr_{1-x}M_xO_{3-\alpha}$ (where M is a trivalent substituent element, x is $0<x<1$, y is $0<y<1$, and $\alpha$ is an oxygen deficiency and is $0<\alpha<0.5$). With the above structure, the fuel cell system can operate more stably and more efficiently even under high-temperature operating conditions.

According to a fifteenth aspect of the present disclosure, in the fuel cell system in any one of the first to twelfth aspects, the electrolyte membrane contains a compound represented by $BaZr_{1-x}Yb_xO_{3-\alpha}$ (where x is $0<x<1$, and $\alpha$ is an oxygen deficiency and is $0<\alpha<0.5$). With the above structure, the fuel cell system can operate more stably and more efficiently even under high-temperature operating conditions.

A fuel cell system control method according to a sixteenth aspect of the present disclosure is a method for controlling a fuel cell system including: a fuel cell that includes a membrane electrode assembly including a proton conducting electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas; a power source that applies a voltage to the fuel cell; and a controller, wherein, in a shutdown process, the controller controls the power source to apply the voltage to the fuel cell such that a terminal voltage of the fuel cell is equal to or higher than an open circuit voltage of the fuel cell.

With the above method, the fuel cell can be shut down while the fuel gas consumption caused by hole conduction in the fuel cell is reduced and deterioration of the fuel cell due to a shortage of the fuel gas is prevented.

Embodiments of the present disclosure will be described with reference to the drawings. In all the drawings, the same or corresponding components are denoted by the same reference symbols, and their description may be omitted.

First Embodiment

<Structure of Fuel Cell System>

As shown in FIG. 1, a fuel cell system 10 according to a first embodiment of the present disclosure is a fuel cell system 10 including a fuel cell 11 that uses a proton (i.e., $H^+$) conducting ceramic electrolyte membrane 18a. The fuel cell system 10 includes the fuel cell 11, an oxidant gas feeder 12, a fuel gas feeder 13, a power source 14, and a controller 15.

The oxidant gas feeder 12 is connected to the fuel cell 11 through an oxidant gas passage 16. The oxidant gas feeder 12 feeds the oxidant gas to the fuel cell 11 through the oxidant gas passage 16. The oxidant gas feeder 12 has the function of controlling the flow rate (i.e., the feed rate) of the oxidant gas to be fed. The controller 15 controls the flow rate. The oxidant gas is a gas containing oxygen, and, for example, oxygen and air are used. The oxidant gas feeder 12 is, for example, an oxygen cylinder or a ventilator such as a fan or a blower that sends air.

The fuel gas feeder 13 is connected to the fuel cell 11 through a fuel gas passage 17. The fuel gas feeder 13 feeds the fuel gas to the fuel cell 11 through the fuel gas passage 17. The fuel gas feeder 13 has the function of controlling the flow rate (i.e., the feed rate) of the fuel gas to be fed. The controller 15 controls the flow rate. The fuel gas used is a gas containing hydrogen. The hydrogen-containing gas may be generated by subjecting a hydrocarbon-based fuel such as $CH_4$ to a chemical reaction (reforming reaction) or may be generated by electrolysis of water. The fuel gas feeder 13 is, for example, a reformer, a hydrogen cylinder, or a hydrogen gas infrastructure.

The fuel cell 11 is a device that includes a membrane electrode assembly 18. The fuel cell generates electric power through an electrochemical reaction using the fuel gas and the oxidant gas. For example, the fuel cell 11 is a solid oxide fuel cell. The membrane electrode assembly 18 includes a proton conducting electrolyte membrane 18a, a cathode 18b disposed on a first surface of the electrolyte membrane 18a, and an anode 18c disposed on a second surface of the electrolyte membrane 18a. The fuel cell 11 is a single cell including one membrane electrode assembly 18 or a stack in which a plurality of cells each including a membrane electrode assembly 18 are stacked and combined together.

The cathode 18b is an electrode and has a thin film form. The cathode 18b is formed of a material having electron conductivity, oxide ion (i.e., $O^{2-}$) and proton conductivity, and oxygen reduction activity (i.e., a cathode material). The cathode material used is, for example, a material represented by a composition formula of $La_{0.6}Sr_{0.4}Co_{0.2}Fe_{0.8}O_3$ or a mixture of this material and a proton conductor. The oxidant gas passage 16 is connected to the cathode 18b. The oxidant gas is fed from the oxidant gas feeder 12 to the cathode 18b.

The anode 18c is an electrode and has a thin film form. The anode 18c is formed of a material having electron conductivity, proton conductivity, and hydrogen oxidation activity (i.e., an anode material). The anode material is, for example, a mixture of Ni and a proton conductor. The fuel gas passage 17 is connected to the anode 18c. The fuel gas is fed from the fuel gas feeder 13 to the anode 18c.

The electrolyte membrane 18a has a thin film form, has a pair of surfaces, and held between the cathode 18b and the anode 18c disposed on the respective surfaces. The electrolyte membrane 18a is formed of a ceramic. The electrolyte membrane 18a is formed of a proton conducting electrolyte material (i.e., a proton conductor). Examples of the proton conductor include oxides. Examples of the proton conductor include perovskite oxides. The proton conductor used is, for example, an electrolyte material represented by $BaCe_{1-x}M_xO_{3-\alpha}$, $BaZr_{1-x-y}Ce_xM_yO_{3-\alpha}$, or $BaZr_{1-x}M_xO_{3-\alpha}$ (where M is a trivalent substituent element, x is 0<x<1, y is 0<y<1, and α is an oxygen deficiency and is 0<α<0.5). The proton conductor used may be an electrolyte material represented by $BaZr_{1-x}Yb_xO_{3-\alpha}$ (where x is 0<x<1, and α is an oxygen deficiency and is 0<α<0.5). However, the proton conductor is not limited to the above materials.

The electrolyte membrane 18a may have, in addition to the proton conductivity, hole conductivity. In this case, an amount of holes corresponding to part or all of the amount of protons migrating through the electrolyte membrane 18a moves from a high-potential side to a low-potential side in the electrolyte membrane 18a.

The power source 14 is connected to terminals of the fuel cell 11 through electric wires 19. The power source 14 applies a voltage and an electric current to the fuel cell 11 through the electric wires 19. In this manner, the electric current generated through power generation by the fuel cell 11 is outputted through the electric wires 19. Moreover, the electric current applied from the power source 14 is inputted to the fuel cell 11 through the electric wires 19. The power source 14 is, for example, an electrical power system, a power generator, or a battery. The battery may be installed in the fuel cell system 10 or may be disposed outside the fuel cell system 10.

A selector 20 is attached to one of the electric wires 19. The power source 14 and an external load 21 are connected in parallel to the fuel cell 11 through the electric wires 19. The selector 20 switches between connection targets of the fuel cell 11, and the state of an electric circuit including the fuel cell 11 and the electric wires 19 (i.e., a fuel cell circuit) is switched between an open circuit state, a first closed circuit state in which the fuel cell 11 is connected to the external load 21, and a second closed circuit state in which the fuel cell 11 is connected to the power source 14. The controller 15 controls the switching between the states of the fuel cell. The external load 21 is connected to the fuel cell 11 through an inverter 22. The electric wires 19 are connected to the inverter 22.

For example, the selector 20 has a movable contact 20a, a first fixed contact 20b, and a second fixed contact 20c. The first fixed contact 20b is connected to the inverter 22. The second fixed contact 20c is connected to the power source 14. A first end of the movable contact 20a is connected to the fuel cell 11.

When a second end of the movable contact 20a is brought into contact with the first fixed contact 20b, the fuel cell 11 is connected to the external load 21 through the inverter 22. In this case, the fuel cell circuit is in the first closed circuit state. When the second end of the movable contact 20a is brought into contact with the second fixed contact 20c, the fuel cell 11 is connected to the power source 14. In this case, the fuel cell circuit is in the second closed circuit state. Moreover, when the second end of the movable contact 20a is not in contact with the first fixed contact 20b and the second fixed contact 20c, the electric wires 19 are disconnected. In this case, the fuel cell circuit is in the open circuit state.

In the open circuit state, the fuel cell 11 is not connected to the power source 14 and the external load 21, and the fuel cell circuit is open. In this state, no current flows through the electric wires 19. Therefore, in the open circuit state, the current extracted from the fuel cell 11 to the outside through the electric wires 19 is 0.

In the first closed circuit state, the fuel cell 11 is connected to the external load 21 through the electric wires 19 and the inverter 22. The current generated through the power generation by the fuel cell 11 is extracted through the inverter 22 and outputted to the external load 21. The controller 15 controls the extracted current.

In the second closed circuit state, the fuel cell 11 is connected to the power source 14 through the electric wires 19. The current and voltage from the power source 14 are applied to the fuel cell 11. The controller 15 controls the applied current and the applied voltage.

The controller 15 may have any structure so long as it has a control function. For example, the controller 15 includes an unillustrated arithmetic processing unit and an unillustrated memory unit that stores control programs. The arithmetic processing unit includes, for example, at least one arithmetic circuit. Examples of the arithmetic circuit include processors such as an MPU (i.e., a microprocessor) and a CPU. The memory unit includes, for example, at least one memory circuit. The memory circuit is, for example, a semiconductor memory. The controller 15 may include a single controller that performs centralized control of the components of the fuel cell system 10 or may include a plurality of controllers that co-operate to perform distributed control.

The arithmetic processing unit executes the control programs in the memory unit, and the controller 15 thereby controls the components included in the fuel cell system 10. For example, the controller 15 controls the fuel gas feeder 13 to adjust the flow rate of the fuel fed to the anode 18c and controls the oxidant gas feeder 12 to adjust the flow rate of the oxidant gas fed to the cathode 18b. Moreover, the controller 15 controls the selector 20 to switch the state of the fuel cell circuit between the open circuit state, the first closed circuit state, and the second closed circuit state. Moreover, the controller 15 controls the power source 14 that applies a voltage to the fuel cell 11 in the shutdown process such that the terminal voltage of the fuel cell 11 is equal to or higher than the open circuit voltage of the fuel cell 11.

<States of Fuel Cell Circuit>

In the first closed circuit state, protons are generated at the anode 18c of the fuel cell 11 through the electrochemical reaction of hydrogen. These protons migrate from the anode 18c through the electrolyte membrane 18a to the cathode 18b. At the cathode 18b, protons and oxygen undergo an electrochemical reaction, and electrons are thereby generated. Then an amount of holes corresponding to part of the amount of the electrons generated flows as a current from the cathode 18b through the electrolyte membrane 18a to the anode 18c. The rest of the electrons are extracted as a current to the external load 21 through the electric wires 19 and the inverter 22.

In the open circuit state, as in the first closed circuit state, protons and oxygen undergo the electrochemical reaction at the cathode 18b, and electrons are thereby generated. Then an amount of holes corresponding to all of the amount of the electrons generated flows as a current from the cathode 18b through the electrolyte membrane 18a to the anode 18c.

In the second closed circuit state, the fuel consumption varies according to the formula "(the voltage at which the electrolysis of water starts or a theoretical electromotive force determined from the concentration of the fuel gas fed to the anode 18c and the concentration of the oxidant gas fed to the cathode 18b)−(the voltage applied from the power source 14 to the fuel cell 11)." The voltage is applied from the power source 14 to the fuel cell 11 such that the terminal voltage of the fuel cell 11 is equal to or higher than the open circuit voltage. In this case, the value of the above formula is changed from a positive value to 0 and to a negative value, and the fuel consumption due to the hole conduction can be reduced. A shortage of the fuel gas can thereby by prevented, so that deterioration of the fuel cell 11 due to the fuel gas shortage can be prevented.

The open circuit voltage is the terminal voltage of the fuel cell 11 specified when no current is inputted/outputted into/from the fuel cell 11 of the fuel cell circuit in the open circuit state. This terminal voltage is detected by, for example, a voltage detector 23. The voltage detector 23 is connected to the electric wires 19 at a position between the fuel cell 11 and the selector 20 so as to be in parallel to the fuel cell 11. The voltage detected by the voltage detector 23 is outputted to the controller 15.

For example, the open circuit voltage is measured by the voltage detector 23 in a state in which the external load 21 and the power source 14 are not connected to the fuel cell 11 and the voltage detector 23 is connected to the fuel cell 11. Therefore, the open circuit voltage is the voltage of the fuel cell 11 measured by the voltage detector 23 in the state in which only the voltage detector 23 is connected to the fuel cell 11. The open circuit voltage has been determined by experiment, simulation-based computation, etc. in advance in the fuel cell 11 in the fuel cell system 10 in the open circuit state. The values determined in advance are made into a table of the open circuit voltage. This table has been stored, for example, in the memory unit.

<Method for Controlling Fuel Cell System>

Figure 2:
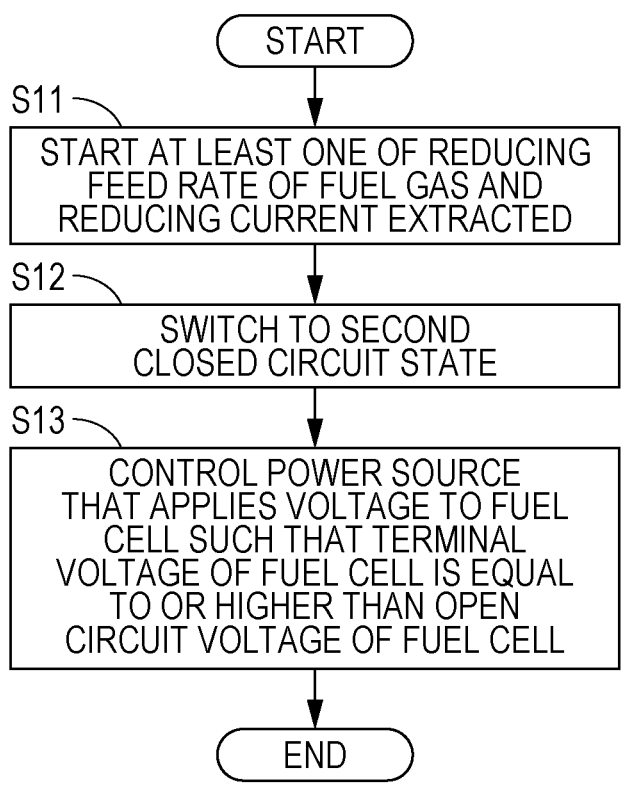
FIG. 2 is a flowchart showing an example of a control method performed in a shutdown process of the fuel cell system shown in FIG. 1.

An example of a method for controlling the fuel cell system 10 having the above-described structure is performed according to a flowchart of the shutdown process shown in FIG. 2. This control is performed by the controller 15.

First, the controller 15 starts the shutdown process upon reception of an instruction to shut down the fuel cell system 10. This shutdown process is started by at least one of reducing the feed rate of the fuel gas and reducing the extracted current (step S11).

As described above, for example, when the fuel cell circuit is in the first closed circuit state, the fuel cell 11 is connected to the inverter 22. Therefore, the controller 15 controls the inverter 22 such that the current extracted from the fuel cell 11 decreases. Moreover, for example, the controller 15 controls the fuel gas feeder 13 such that the feed rate of the fuel gas decreases. In this manner, the temperature of the fuel cell 11 decreases. The shutdown process is started when the temperature of the fuel cell 11 starts decreasing and performed until the temperature of the fuel cell 11 becomes lower than a prescribed temperature (e.g., 200° C.).

Then the controller 15 controls the selector 20 to switch the state of the fuel cell circuit to the second closed circuit state (step S12). When the fuel cell circuit has already been in the second closed circuit state, the selector 20 maintains the second closed circuit state. In the second closed circuit state, the fuel cell 11 is connected to the power source 14.

The controller 15 controls the power source 14 to apply a voltage to the fuel cell 11 such that the terminal voltage of the fuel cell 11 is equal to or higher than the open circuit voltage of the fuel cell 11 (step S13). In this case, the controller 15 acquires the open circuit voltage from, for example, the memory unit. Next, based on the voltage detected by the voltage detector 23, a voltage is applied from the power source 14 to the fuel cell 11 such that the terminal voltage of the fuel cell 11 is equal to or higher than the open circuit voltage. In this manner, the fuel consumption in the fuel cell 11 can be reduced, and the fuel cell system can be shut down while deterioration of the fuel cell 11 due to a shortage of the fuel gas is prevented.

<Modification 1>

In a fuel cell system 10 according to modification 1 of the first embodiment of the present disclosure, the controller 15 controls the power source 14 that applies a voltage to the fuel cell 11 in the shutdown process such that the terminal voltage of the fuel cell 11 is equal to or higher than the open circuit voltage of the fuel cell 11 and lower than the voltage at which the electrolysis of water starts at the cathode 18b (i.e., electrolysis voltage). The electrolysis voltage is the voltage at which the generation of hydrogen starts at the anode 18c of the fuel cell 11 and decomposition of water vapor starts at the cathode 18b. The electrolysis voltage in the fuel cell system 10 has been determined in advance by experiment, simulation-based computation, etc. The values determined in advance are made into a table of the electrolysis voltage. This table has been stored in, for example, the memory unit. In the experiment, the electrolysis voltage is determined by detecting a change in the concentration of hydrogen using a sensor.

Specifically, when the terminal voltage of the fuel cell 11 is equal to or higher than the electrolysis voltage, for example, water contained in the oxidant gas fed to the cathode 18b is decomposed into protons and oxygen through an electrochemical reaction. The protons migrate to the anode 18c through the electrolyte membrane 18a and become hydrogen at the anode 18c. As described above, during the electrolysis of water, the oxidation reaction occurs at the electrode 18c. On the basis of this reaction, the electrode 18c is the cathode. However, the electrode 18c is referred to as the anode on the basis of the reaction during power generation.

The concentration of water vapor in the oxidant gas fed to the cathode 18b is extremely low, i.e., about 3%, even at, for example, a temperature of 25° C. and a humidity of 100%. Therefore, if the terminal voltage of the fuel cell 11 is equal to or higher than the electrolysis voltage, all of the small amount of water vapor may be decomposed at the cathode 18b. In this case, an oxidation-reduction reaction occurs at the cathode 18b due to a shortage of water vapor, causing deterioration of the cathode 18b.

The current flowing from the cathode 18b through the electrolyte membrane 18a to the anode 18c due to hole conduction varies depending on the voltage applied from the power source 14 to the fuel cell 11. Therefore, the fuel consumption varies depending on a comparison value defined below. The comparison value is determined from the formula "(the voltage at which the electrolysis of water starts or a theoretical electromotive force determined from the concentration of the fuel gas fed to the anode 18c and the concentration of the oxidant gas fed to the cathode 18b)–(the voltage applied from the power source 14 to the fuel cell 11)."

When the comparison value is 0, the fuel consumption is 0. However, in the case where the comparison value is positive, as the comparison value increases, the fuel consumption increases. When the comparison value is negative, the fuel consumption is 0. However, fuel (e.g., hydrogen) is generated through the electrolysis of water. The fuel consumption can be determined by experiment using the fuel cell system 10, simulation-based computation, etc.

Therefore, the controller 15 controls the power source 14 to apply a voltage to the fuel cell 11 in the shutdown process such that the terminal voltage of the fuel cell 11 is equal to or higher than the open circuit voltage and lower than the electrolysis voltage. This allows the fuel consumption to be reduced while the electrolysis of water at the cathode 18b is prevented. Therefore, deterioration of the fuel cell 11 due to a shortage of water and a shortage of the fuel gas can be prevented.

When the terminal voltage of the fuel cell 11 is equal to or higher than the open circuit voltage and lower than the electrolysis voltage, the fuel gas is consumed due to hole conduction. Therefore, the controller 15 may control the fuel gas feeder 13 such that the fuel gas is fed at a flow rate equal to or higher than the fuel consumption. In this manner, a shortage of the fuel gas can be prevented more reliably.

In a fuel cell including an oxide ion conducting electrolyte membrane, the electrolysis of water occurs at the anode. Therefore, for example, when a fuel gas containing a large amount of water vapor is generated by reforming natural gas and fed to the fuel cell, the problem of deterioration of the cathode caused by a shortage of water due to the electrolysis of water does not occur.

Figure 3:
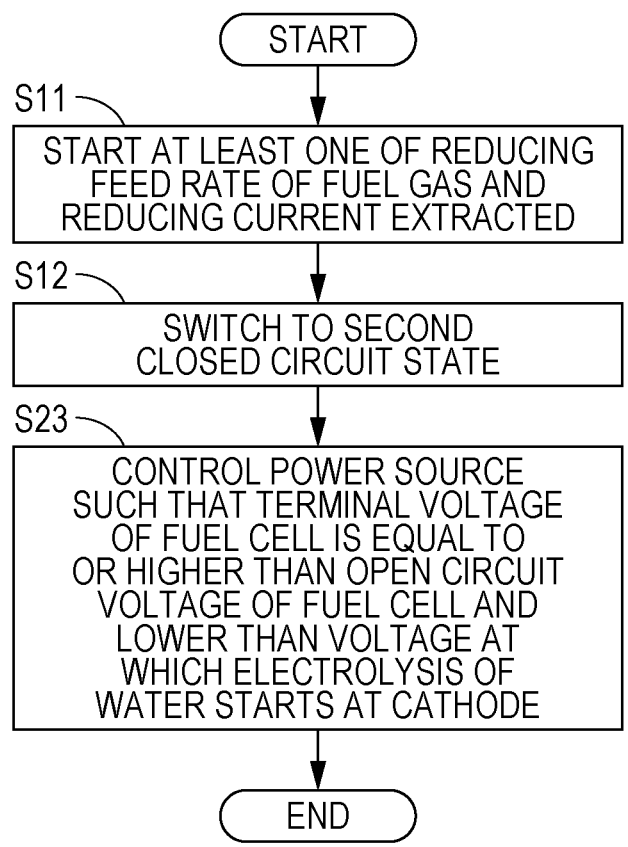
FIG. 3 is a flowchart showing an example of the control method performed in the shutdown process of a fuel cell system according to modification 1 of the first embodiment of the present disclosure.

FIG. 3 is a flowchart showing a method for controlling the above fuel system. In the flow in FIG. 3, the processing in step S23 is performed instead of the processing in step S13 in FIG. 2. The processing in step S11 and the processing in S12 in FIG. 3 are the same as the processing in step S11 and the processing in S12 in FIG. 2.

In S23, the controller 15 controls the power source 14 in the shutdown process such that the terminal voltage of the fuel cell 11 is equal to or higher than the open circuit voltage and lower than the electrolysis voltage. This allows the shutdown process of the fuel cell system 10 to be performed while deterioration of the fuel cell 11 due to a shortage of water and a shortage of the fuel gas is prevented.

Second Embodiment

Figure 4:
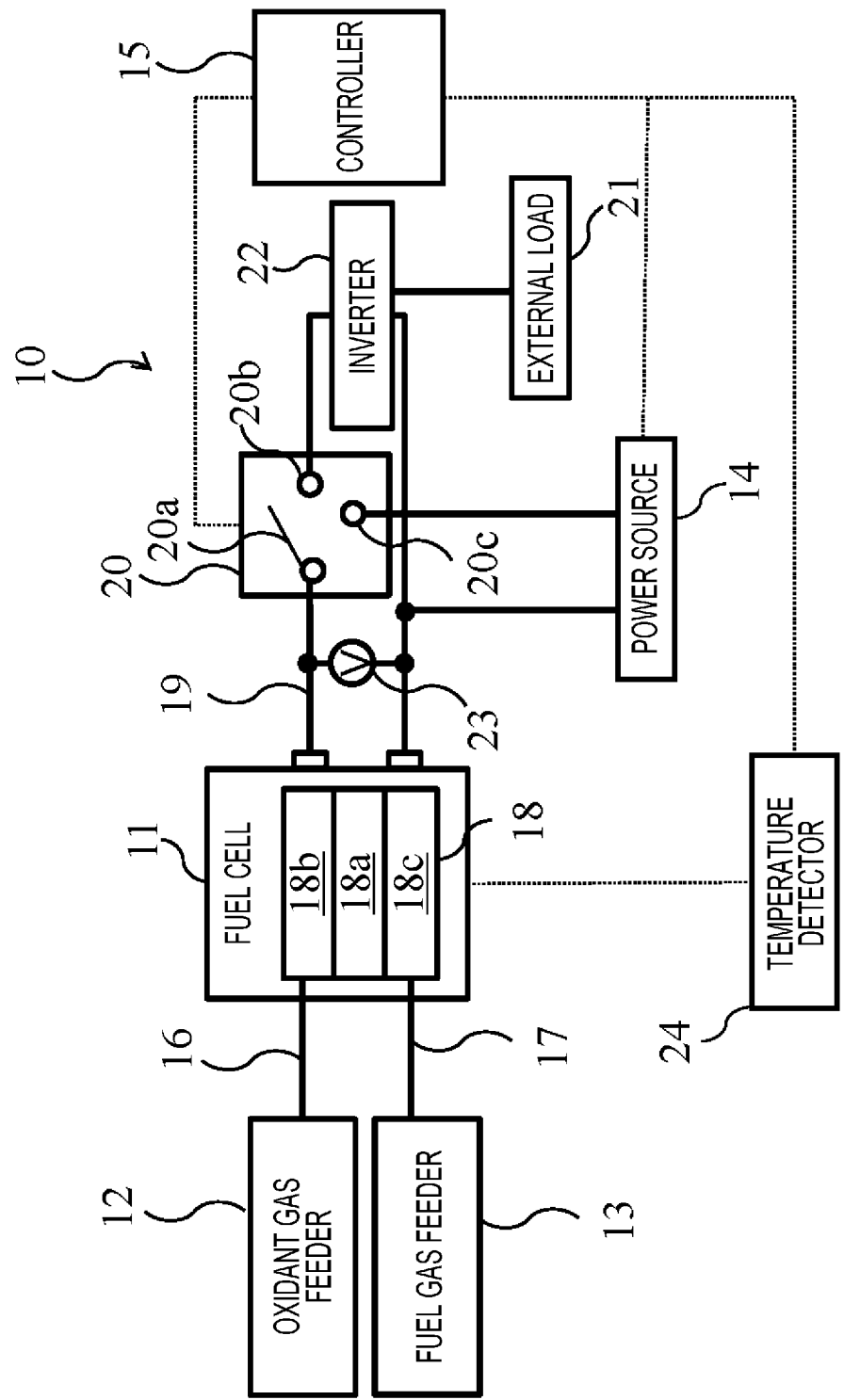
FIG. 4 is a block diagram schematically showing an example of the structure of a fuel cell system according to a second embodiment of the present disclosure.

As shown in FIG. 4, a fuel cell system 10 according to a second embodiment of the present disclosure further includes, in addition to the components in the first embodiment, a temperature detector 24 that detects the temperature of the fuel cell 11. The electrolyte membrane 18a has hole conductivity. The controller 15 controls the power source 14 in the shutdown process such that the terminal voltage is equal to or higher than the open circuit voltage until the temperature detected by the temperature detector 24 is determined to be equal to or lower than the temperature at which hole conduction in the electrolyte membrane 18a decreases (this temperature may be hereinafter referred to as "first prescribed temperature"). The phrase "hole conduction decreases" means that the hole conduction is lower than that at the temperature of the fuel cell 11 at the start of the shutdown process. It is only necessary that the first prescribed temperature be set to a temperature lower than the temperature of the fuel cell 11 at the start of the shutdown process. For example, when the temperature of the fuel cell 11 at the start of the shutdown process is 600° C., the first prescribed temperature is lower than 600° C., may be 500° C., and may be 400° C. When the temperature of the fuel cell 11 at the start of the shutdown process is 500° C., the first prescribed temperature is a temperature lower than 500° C. and may be 400° C. When the temperature of the fuel cell 11 at the start of the shutdown process is 400° C., it is only necessary that the first prescribed temperature be a temperature lower than 400° C. The temperature at the start of the shutdown process is not limited to 400° C., 500° C., and 600° C. described above.

The first prescribed temperature may be, for example, the temperature at which the hole conduction is reduced to 4/5 of the hole conduction at the temperature at the start of the shutdown process and may be the temperature at which the hole conduction is reduced to 2/3. The temperature of the fuel cell 11 is measured directly or indirectly using the temperature detector 24 as follows.

Specifically, the temperature detector 24 is, for example, a temperature sensor using a thermocouple. The temperature detector 24 detects the temperature of the fuel cell 11 and outputs the detected temperature to the controller 15. The temperature of the fuel cell 11 is, for example, the temperature of the anode 18c or the temperature of the electrolyte membrane 18a. The temperature detector 24 may measure the temperature at one or a plurality of points.

The temperature detector 24 may measure the temperature of the fuel cell 11 directly or indirectly. In the indirect measurement, the temperature detector 24 may detect the temperature of another portion that correlates with the temperature of the fuel cell 11, and the temperature of the fuel cell 11 may be determined from the detected temperature. Examples of the other portion include a structural member near the fuel cell 11 in the fuel cell system 10, the fuel gas and the oxidant gas fed to the fuel cell 11, and a gas discharged from the fuel cell 11. In this case, the temperature of the fuel cell 11 may be determined from the detected temperature on the basis of the prescribed correlation between the detected temperature and the temperature of the fuel cell 11.

An example of a method for controlling the fuel cell system 10 having the above-described structure is performed according to a flowchart of the shutdown process shown in FIG. 5. In the flow shown in FIG. 5 also, the processing in each of the steps shown in FIG. 2 is performed. However, in the flow in FIG. 5, the processing in S14 is performed after the processing in step S13 in FIG. 2. The processing in each of S11 to S13 in FIG. 5 is the same as that in FIG. 2.

Specifically, with the decrease in the feed rate of the fuel gas in the shutdown process and/or the decrease in the extracted current, the temperature of the fuel cell 11 decreases from the temperature during operation (e.g., 500 to 700° C.). Then the controller 15 determines whether or not the temperature of the fuel cell 11 detected by the temperature detector 24 has reached the first prescribed temperature (step S14).

The temperature at which the hole conduction in the electrolyte membrane 18a decreases (the temperature may be hereinafter referred to as the "first prescribed temperature") has been determined in advance by experiment in the fuel cell system 10, simulation-based computation, etc. and stored in, for example, the memory unit. The first prescribed temperature is, for example, equal to or lower than 500° C. and preferably equal to or lower than 400° C. When the first prescribed temperature is equal to or lower than 500° C., the hole conduction in the electrolyte membrane 18a is lower than that at 600° C. When the first prescribed temperature is equal to or lower than 400° C., the hole conduction is lower than that at 500° C.

If the detected temperature is higher than the first prescribed temperature (step S14: NO), the controller 15 returns to S13. If the controller 15 determines that the detected temperature is equal to or lower than the first prescribed temperature (step S14: YES), the shutdown process is ended.

When the detected temperature is equal to or lower than the first prescribed temperature, the electric resistance of the electrolyte membrane 18a increases, and the hole conduction is inhibited. In this case, the consumption of the fuel gas by the hole conduction decreases. Therefore, for example, the controller 15 may switch the state of the fuel cell circuit from the second closed circuit state to another state (for example, the first closed circuit state or the open circuit state). Moreover, the controller 15 may control the power source 14 such that the application of the voltage to the fuel cell 11 is stopped.

As described above, when the degree of hole conduction is high, the power source 14 applies a voltage to the fuel cell 11 such that the terminal voltage of the fuel cell 11 is equal to or higher than the open circuit voltage. In this manner, the shortage of the fuel gas due to the hole conduction is reduced, and the shutdown process of the fuel cell system 10 can be performed while deterioration of the fuel cell 11 is prevented.

<Modification 2>

A fuel cell system 10 according to modification 2 of the present disclosure further includes the temperature detector 24 that detects the temperature of the fuel cell 11. In the shutdown process, the controller 15 controls the power source 14 such that the terminal voltage is equal to or higher than the open circuit voltage until the temperature detected by the temperature detector 24 is determined to be equal to or lower than the temperature at which the oxidation-reduction reaction at the anode 18c slows down. The phrase "the oxidation-reduction reaction slows down" means that the oxidation-reduction reaction is slower than that at the temperature of the fuel cell 11 at the start of the shutdown process. It is only necessary that second prescribed temperature (the temperature at which the oxidation-reduction reaction at the anode 18c slows down) be set to be lower than the temperature of the fuel cell 11 at the start of the shutdown process. For example, when the temperate of the fuel cell 11 at the start of the shutdown process is 600° C., the second prescribed temperature is lower than 600° C., may be 400° C., or may be 300° C. When the temperate of the fuel cell 11 at the start of the shutdown process is 500° C., the second prescribed temperature is lower than 500° C., may be 400° C., or may be 300° C. When the temperate of the fuel cell 11 at the start of the shutdown process is 400° C., the second prescribed temperature is lower than 400° C. and may be 300° C. The temperature at the start of the shutdown process is not limited to 400° C., 500° C., and 600° C. described above. The temperature of the fuel cell 11 is measured by the temperature detector 24 directly or indirectly, as in the second embodiment.

The temperature at which the oxidation-reduction reaction at the anode 18c slows down (the second prescribed temperature) has been determined in advance by, for example, experiment in the fuel cell system 10, simulation-based computation, etc. The values determined in advance are made into a table of the temperature at which the oxidation-reduction reaction slows down. This table has been stored in, for example, the memory unit. The second prescribed temperature is, for example, the temperature at which Ni contained in the anode 18c is not oxidized and is 400° C. and more preferably a temperature equal to or higher than 200° C. and equal to or lower than 300° C. When the second prescribed temperature is equal to or lower than 400° C., the oxidation-reduction reaction is slower than that at 600° C. or 500° C. When the second prescribed temperature is 300° C. or lower, the oxidation-reduction reaction is slower than that at 400° C.

Specifically, when a shortage of the fuel gas occurs in the anode 18c, the oxidant gas and oxide ions may enter the anode 18c from the cathode 18b, or gas present in the vicinity of the anode 18c may enter the anode 18c. In this case, when the temperature of the fuel cell 11 is higher than the second prescribed temperature, Ni contained in the anode 18c is oxidized by the oxidant gas etc.

However, in S14 in the flowchart of the method for controlling the fuel cell system 10 shown in FIG. 5, the controller 15 determines whether or not the temperature of the fuel cell 11 detected by the temperature detector 24 has reached the second prescribed temperature. If the detected temperature is higher than the second prescribed temperature (step S14: NO), the controller 15 returns to the processing in S13. In this case, when the rate of the oxidation-reduction reaction in the anode 18c is high, the power source 14 applies a voltage to the fuel cell 11 such that the terminal voltage of the fuel cell 11 is equal to or higher than the open circuit voltage. This reduces the consumption of the fuel gas due to hole conduction, so that a shortage of the fuel gas in the anode 18c is prevented. Therefore, oxidation of Ni in the anode 18c is prevented, and the shutdown process of the fuel cell system 10 can be performed while deterioration of the fuel cell 11 due to the oxidation-reduction reaction at the anode 18c is prevented.

If the controller 15 determines that the detected temperature is equal to or lower than the second prescribed temperature (step S14: YES), the shutdown process is ended.

<Modification 3>

In a fuel cell system 10 according to modification 3 of the second embodiment of the present disclosure, the controller 15 controls the power source 14 in the shutdown process such that the terminal voltage is equal to or higher than the open circuit voltage until the temperature detected by the temperature detector 24 is determined to be equal to or lower than 400° C.

For example, in S14 in the flowchart of the method for controlling the fuel cell system 10 shown in FIG. 5, the controller 15 determines whether or not the temperature of the fuel cell 11 detected by the temperature detector 24 has reached 400° C. (the prescribed temperature). If the detected temperature is higher than 400° C. (step S14: NO), the controller 15 returns to the processing in S13. If the controller 15 determines that the detected temperature is equal to or lower than 400° C. (step S14: YES), the shutdown process is ended.

In this manner, when the degree of hole conduction in the electrolyte membrane 18a and/or the rate of the oxidation-reduction reaction in the anode 18c is high, the power source 14 applies a voltage to the fuel cell 11 such that the terminal voltage is equal to or higher than the open circuit voltage. This allows the shutdown process of the fuel cell system 10 to be performed while deterioration of the fuel cell 11 due to a shortage of the fuel gas is prevented.

<Modification 4>

In all the fuel cell systems 10 in the above embodiments and modifications, the shutdown process may be performed in a period from when the temperature of the fuel cell 11 starts decreasing until the temperature becomes lower than 200° C. For example, when the controller 15 reduces at least one of the feed rate of the fuel gas and the extracted current, the power generation reaction in the fuel cell 11 slows down, and the temperature of the fuel cell 11 decreases. When the controller 15 detects the start of the temperature reduction, the shutdown process is started.

When the temperature of the fuel cell 11 is equal to or higher than 200° C., the controller 15 controls the power source 14 to apply a voltage to the fuel cell 11 such that the terminal voltage of the fuel cell 11 is equal to or higher than the open circuit voltage. This allows the shutdown process of the fuel cell system 10 to be performed while deterioration of the fuel cell 11 due to a shortage of the fuel gas is prevented. When the controller 15 determines that the temperature of the fuel cell 11 is equal to or lower than 200° C., the shutdown process is ended.

<Modification 5>

In all the fuel cell systems 10 in the above embodiments and modifications, the controller may control the fuel gas feeder 13 in the shutdown process such that the amount of the fuel gas fed to the anode 18c is larger than the fuel consumption in the fuel cell 11. In this case, the flow rate (i.e., the feed rate) of the fuel gas fed from the fuel gas feeder 13 to the anode 18c is larger than the amount of the fuel gas consumed in the fuel cell 11 (i.e., the fuel consumption). Therefore, a shortage of the fuel gas in the anode 18c is prevented more reliably, and deterioration of the fuel cell 11 can be prevented.

The above embodiments may be combined with each other so long as they do not exclude each other. For example, in the second embodiment and modifications 2 to 5, as in modification 1, the controller 15 may control the power source 14 to apply a voltage to the fuel cell 11 in the shutdown process such that the terminal voltage of the fuel cell 11 is equal to or higher than the open circuit voltage of the fuel cell 11 and lower than the voltage at which the electrolysis of water starts at the cathode 18b (i.e., the electrolysis voltage). In this case, in the method for controlling the fuel cell system 10, step S23 in FIG. 3 may be performed instead of step S13 in the flow in FIG. 5.

From the foregoing description, many modifications to the present disclosure and other embodiments are apparent to those skilled in the art. Therefore, the foregoing description is to be construed as illustrative only and is provided for the purpose of teaching those skilled in the art the best mode for carrying out the present disclosure. The details of the structure and/or functions of the present disclosure may be substantially modified without departing from the spirit of the present disclosure.

The fuel cell system of the present disclosure and the fuel cell system control method of the present disclosure are useful as a fuel cell system and a fuel cell system control method in which the fuel cell system can be shut down while deterioration of the fuel cell is prevented.

What is claimed is:

1. A fuel cell system comprising:
    a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas;
    a power source that applies a voltage to the fuel cell;
    a temperature detector that detects a temperature of the fuel cell; and
    a controller including a processing unit and a memory circuit storing a control program,
    wherein, the control program, when executed by the processing unit, causes the controller, in a shutdown process, to control the power source to apply the voltage to the fuel cell such that a terminal voltage of the fuel cell is equal to or higher than an open circuit voltage of the fuel cell,
    wherein the electrolyte membrane has hole conductivity, and
    wherein the control program, when executed by the processing unit, causes the controller to control the power source in the shutdown process such that the terminal voltage is equal to or higher than the open circuit voltage until the temperature detected by the temperature detector is determined to be equal to or lower than a temperature at which hole conduction in the electrolyte membrane decreases.

2. The fuel cell system according to claim 1, wherein the control program, when executed by the processing unit, causes the controller to control the power source in the shutdown process such that the terminal voltage is equal to or higher than the open circuit voltage and lower than a voltage at which electrolysis of water starts at the cathode.

3. A fuel cell system comprising:
    a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas;
a power source that applies a voltage to the fuel cell;
a temperature detector that detects a temperature of the fuel cell; and
a controller including a processing unit and a memory circuit storing a control program,
wherein, the control program, when executed by the processing unit, causes the controller, in a shutdown process, to control the power source to apply the voltage to the fuel cell such that a terminal voltage of the fuel cell is equal to or higher than an open circuit voltage of the fuel cell, and
wherein the control program, when executed by the processing unit, causes the controller to control the power source in the shutdown process such that the terminal voltage is equal to or higher than the open circuit voltage until the temperature detected by the temperature detector is determined to be equal to or lower than a temperature at which an oxidation-reduction reaction at the anode slows down.

4. The fuel cell system according to claim 1, wherein the control program, when executed by the processing unit, causes the controller to control the power source in the shutdown process such that the terminal voltage is equal to or higher than the open circuit voltage until the temperature detected by the temperature detector is determined to be equal to or lower than 500° C.

5. The fuel cell system according to claim 1, wherein the control program, when executed by the processing unit, causes the controller to control the power source in the shutdown process such that the terminal voltage is equal to or higher than the open circuit voltage until the temperature detected by the temperature detector is determined to be equal to or lower than 400° C.

6. The fuel cell system according to claim 1, further comprising a voltage detector that detects a voltage of the fuel cell,
wherein the open circuit voltage is the voltage of the fuel cell that is detected by the voltage detector when no electric current is inputted/outputted to/from the fuel cell.

7. The fuel cell system according to claim 1, wherein the shutdown process is performed in a period from when the temperature of the fuel cell starts decreasing until the temperature of the fuel cell becomes lower than 200° C.

8. The fuel cell system according to claim 1, further comprising:
a fuel gas feeder that feeds the fuel gas to the anode; and
an oxidant gas feeder that feeds the oxidant gas to the cathode.

9. The fuel cell system according to claim 8, wherein the control program, when executed by the processing unit, causes the controller to control the fuel gas feeder in the shutdown process such that the amount of the fuel gas fed to the anode is larger than a fuel consumption of the fuel cell.

10. The fuel cell system according to claim 1, wherein the power source is an electrical power system, a power generator, or a battery.

11. The fuel cell system according to claim 1, wherein the fuel cell is a solid oxide fuel cell.

12. The fuel cell system according to claim 1, wherein the electrolyte membrane contains an oxide.

13. A fuel cell system comprising:
a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas;
a power source that applies a voltage to the fuel cell; and
a controller including a processing unit and a memory circuit storing a control program,
wherein, the control program, when executed by the processing unit, causes the controller, in a shutdown process, to control the power source to apply the voltage to the fuel cell such that a terminal voltage of the fuel cell is equal to or higher than an open circuit voltage of the fuel cell,
wherein the electrolyte membrane contains a compound represented by $BaCe_{1-x}M_xO_{3-\alpha}$, $BaZr_{1-x-y}Ce_xM_yO_{3-\alpha}$, or $BaZr_{1-x}M_xO_{3-\alpha}$, where M is a trivalent substituent element, x is $0<x<1$, y is $0<y<1$, and $\alpha$ is an oxygen deficiency and is $0<\alpha<0.5$.

14. A fuel cell system comprising:
a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas;
a power source that applies a voltage to the fuel cell; and
a controller including a processing unit and a memory circuit storing a control program,
wherein, the control program, when executed by the processing unit, causes the controller, in a shutdown process, to control the power source to apply the voltage to the fuel cell such that a terminal voltage of the fuel cell is equal to or higher than an open circuit voltage of the fuel cell,
wherein the electrolyte membrane contains a compound represented by $BaZr_{1-x}Yb_xO_{3-\alpha}$, where x is $0<x<1$, and $\alpha$ is an oxygen deficiency and is $0<\alpha<0.5$.

15. A method for controlling a fuel cell system including:
a fuel cell that includes a membrane electrode assembly including a proton conducting electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas;
a power source that applies a voltage to the fuel cell;
a temperature detector that detects a temperature of the fuel cell; and
a controller including a processing unit and a memory circuit storing a control program,
wherein, in a shutdown process, the control program, when executed by the processing unit, causes the controller to control the power source to apply the voltage to the fuel cell such that a terminal voltage of the fuel cell is equal to or higher than an open circuit voltage of the fuel cell,
wherein the electrolyte membrane has hole conductivity, and
wherein the control program, when executed by the processing unit, causes the controller to control the power source in the shutdown process such that the terminal voltage is equal to or higher than the open circuit voltage until the temperature detected by the temperature detector is determined to be equal to or lower than a temperature at which hole conduction in the electrolyte membrane decreases.

16. A fuel cell system comprising:
a fuel cell that includes a membrane electrode assembly including a proton conducting ceramic electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas;
a power source that applies a voltage to the fuel cell; and
a controller including a processing unit and a memory circuit storing a control program,
wherein, the control program, when executed by the processing unit, causes the controller, in a shutdown process, to control the power source to apply the voltage to the fuel cell such that a terminal voltage of the fuel cell is equal to or higher than an open circuit voltage of the fuel cell, and
wherein the electrolyte membrane contains a compound represented by $BaCe_{1-x}M_xO_{3-\alpha}$ or $BaZr_{1-x-y}Ce_xM_yO_{3-\alpha}$, where M is a trivalent substituent element, x is $0<x<1$, y is $0<y<1$, and $\alpha$ is an oxygen deficiency and is $0<\alpha<0.5$.

17. The method for controlling a fuel cell system according to claim 15, wherein the proton conducting electrolyte membrane is a ceramic electrolyte membrane.

18. The method for controlling a fuel cell system according to claim 17, wherein the ceramic electrolyte membrane contains a compound represented by $BaCe_{1-x}M_xO_{3-\alpha}$ or $BaZr_{1-x-y}Ce_xM_yO_{3-\alpha}$, where M is a trivalent substituent element, x is $0<x<1$, y is $0<y<1$, and $\alpha$ is an oxygen deficiency and is $0<\alpha<0.5$.

19. A method for controlling a fuel cell system including:
a fuel cell that includes a membrane electrode assembly including a proton conducting electrolyte membrane, a cathode disposed on a first surface of the electrolyte membrane, and an anode disposed on a second surface of the electrolyte membrane, the fuel cell generating electric power through an electrochemical reaction using a fuel gas and an oxidant gas;
a power source that applies a voltage to the fuel cell; and
a controller including a processing unit and a memory circuit storing a control program,
wherein, in a shutdown process, the control program, when executed by the processing unit, causes the controller to control the power source to apply the voltage to the fuel cell such that a terminal voltage of the fuel cell is equal to or higher than an open circuit voltage of the fuel cell,
wherein the proton conducting electrolyte membrane is a ceramic electrolyte membrane,
the ceramic electrolyte membrane contains a compound represented by $BaCe_{1-x}M_xO_{3-\alpha}$, or $BaZr_{1-x-y}Ce_xM_yO_{3-\alpha}$, where M is a trivalent substituent element, x is $0<x<1$, y is $0<y<1$, and $\alpha$ is an oxygen deficiency and is $0<\alpha<0.5$.

* * * * *